Aug. 30, 1949.  J. W. MacCLATCHIE  2,480,488
WIRE LINE GUIDE
Filed Nov. 11, 1944
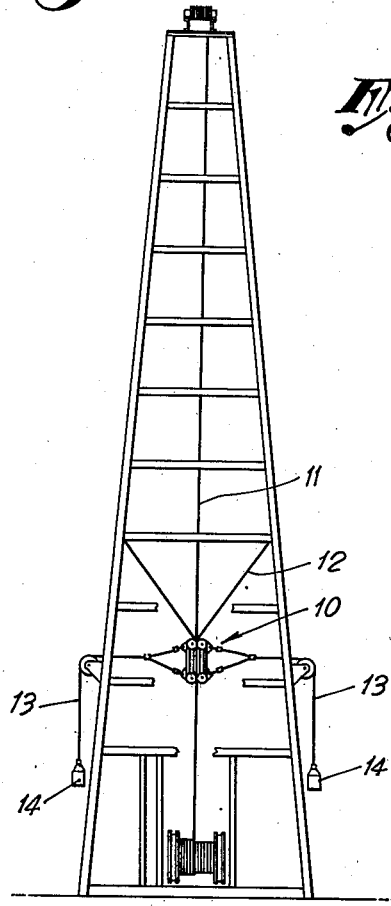
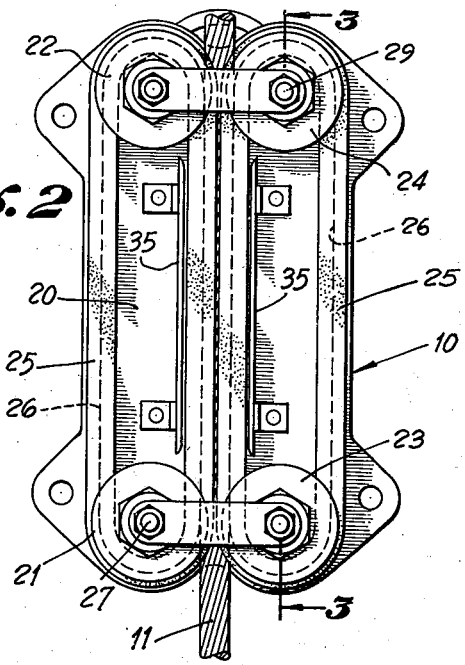
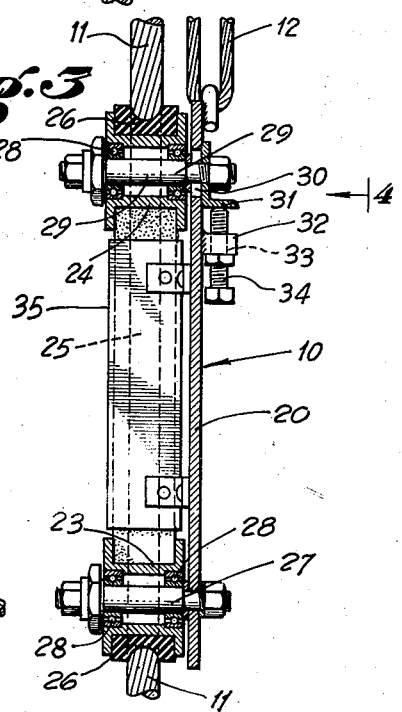
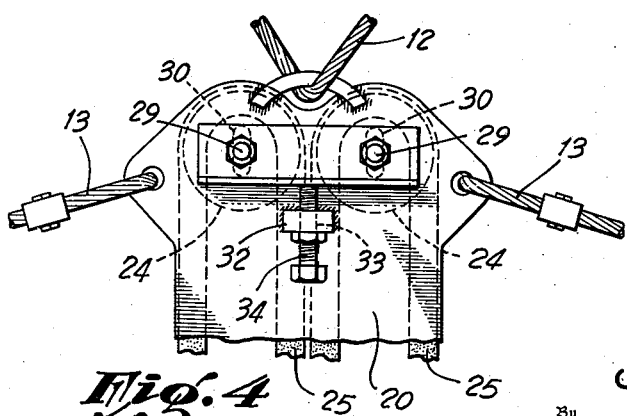
Inventor:
JOHN W. MacCLATCHIE,
By Robert M. McManigal
Attorney.

Patented Aug. 30, 1949

2,480,488

UNITED STATES PATENT OFFICE 2,480,488

WIRE LINE GUIDE

John W. MacClatchie, Los Angeles, Calif.

Application November 11, 1944, Serial No. 563,059

1 Claim. (Cl. 254—190)

This invention relates to improvements in wire line guides which are used to steady and prevent whip in the wire lines which are used on hoisting mechanisms so that the wire lines will spool correctly on the hoisting drums.

As used in oil drilling, the wire line guide is suspended above the hoisting drum by cables which pass over pulleys and which carry suspended weights. These weights permit a sidewise movement of the guide, but prevent sudden whips which might cause the line to spool incorrectly.

The object of my invention is to provide an improved wire line guide, which is economical to make and which is efficient in operation.

Another object of my invention is to provide a wire line guide in which the wire line is adapted to pass between two endless belts, which belts move with the line so that there is a negligible amount of friction.

Another object of my invention is to provide means to compensate for wear on the endless belts.

My invention has many other objects, advantages, and features, some of which, with the foregoing, will be set forth at length in the following description where I shall outline one form of my invention, which I have selected for illustration in the drawings accompanying and forming a part of the present specification.

In the drawings:

Figure 1 is an elevational view in position of a derrick structure showing the invention applied thereto.

Figure 2 is a front elevational view of the wire line guide of my invention.

Figure 3 is a sectional view on the line 3—3 of Figure 2.

Figure 4 is a fragmentary rear elevational view showing the adjusting means indicated by the arrow 4 in Figure 3.

In the drawing the numeral 10 refers to the wire line guide and the numeral 11 refers to the wire line. The wire line guide may be mounted in the derrick in any convenient manner, for example, by means of cables 12 and 13, and weights 14.

The wire line guide consists of a supporting frame 20 on which are mounted two sets of rollers 21 and 22, and 23 and 24 respectively.

Endless belts 25 are adapted to be mounted around each set of rollers, which belts are preferably but not necessarily provided with grooves 26. Different sizes of grooves are preferably provided for the different sizes of wire lines. For example, grooves having inch and inch and one-quarter radii are provided for use with inch and inch and one-quarter wire lines, respectively. As shown in Figure 2, the wire line 11 is adapted to be positioned between the adjacent sides of the endless belts 25.

The rollers 21 and 23 are mounted on the stub shafts 27 by means of bearings 28. In order to mount the endless belts 25 on the rollers 22 and 24, and in order to compensate for wear on said belts, means are preferably provided for adjusting the position of the rollers 22 and 24 with respect to the position of rollers 21 and 23. As an instance of this arrangement the rollers 22 and 24 are mounted on stub shafts 29 by means of bearings, which shafts are mounted in longitudinal openings 30 in the frame 20. The frame 20 is provided with an adjustment flange 31 and a lug 32, which lug has a threaded opening 33. A bolt 34 is threaded through the threaded opening 33 and bears against flange 31, so that by turning the bolt 34 the rollers 22 and 24 may be raised or lowered as desired.

As an aid in maintaining the endless belts 25 in contact with the wire line 11 throughout the entire length of the guide, guide plates 35 are provided on the frame 20.

The wire line guide is mounted in the derrick in such a manner that the wire line is positioned in the adjacent grooves 26 of the endless belts 25, and in operation, both of the endless belts move with the wire line. By means of the wire line guide of my invention, a negligible amount of friction is set up as the wire line 11 is spooled on or unwound from the hoisting drum.

From the foregoing description taken in connection with the accompanying drawings the uses, advantages, and operation of the wire line guides of my invention will be readily understood by those skilled in the art to which the invention appertains. While I have described the principle of operation, together with the form of my invention which I now consider to be the best embodiment thereof, I desire to have it understood that the form shown is merely illustrative and that the invention is not to be limited to the details disclosed herein, but is to be accorded the full scope of the appended claim.

I claim as my invention:

A wire line guide comprising a frame plate, a pair of rollers mounted for free rotation in spaced relationship adjacent each end of said frame plat plate, two endless belts of flexible material mounted on and extending around the corresponding rollers of each pair, said belts being of uniform crosssectional shape and area throughout their lengths with each belt having a longitudinally extending groove in its outer surface, portions of the lengths of each of the two belts extending in side by side parallel relationship with the said grooves forming a channel for reception of a wire line whereby said belts may guide and move freely with the wire line.

JOHN W. MacCLATCHIE.

REFERENCES CITED

The following references are of record in the file of this patent:

UNITED STATES PATENTS

| Number | Name | Date |
|---|---|---|
| 1,552,161 | Houghton | Sept. 1, 1925 |
| 1,779,479 | Leech | Oct. 28, 1930 |
| 1,904,885 | Seeley | Apr. 18, 1933 |
| 2,179,094 | Joss | Nov. 7, 1939 |
| 2,211,299 | Smith | Aug. 13, 1940 |
| 2,255,314 | Graham | Sept. 9, 1941 |

FOREIGN PATENTS

| Number | Country | Date |
|---|---|---|
| 56,345 | Norway | Mar. 23, 1936 |